Figure 3:
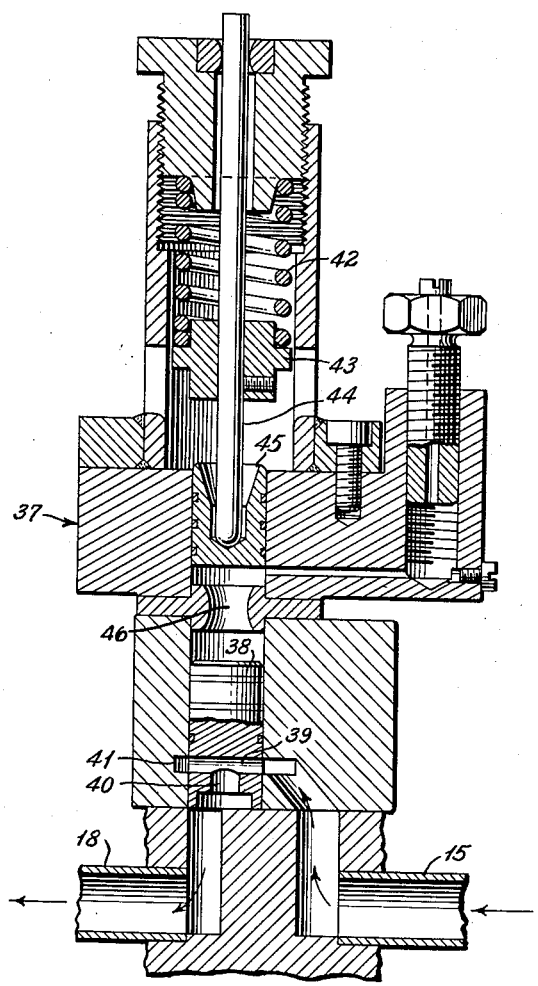

Jan. 6, 1959    R. LEVISON ET AL    2,867,004
PRODUCTION OF POLYAMIDE BARS IN CONTINUOUS PROCESS
Filed Dec. 30, 1954                 2 Sheets-Sheet 1
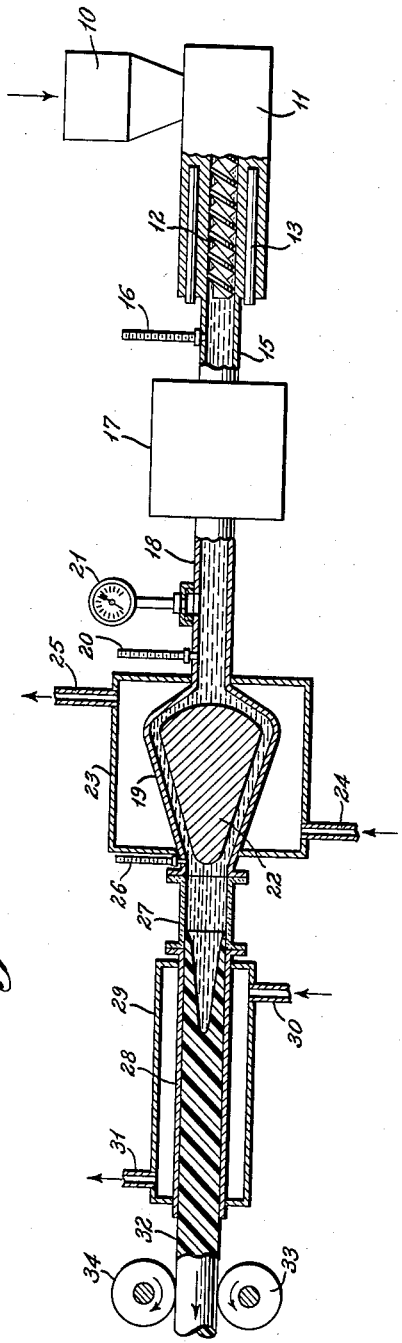
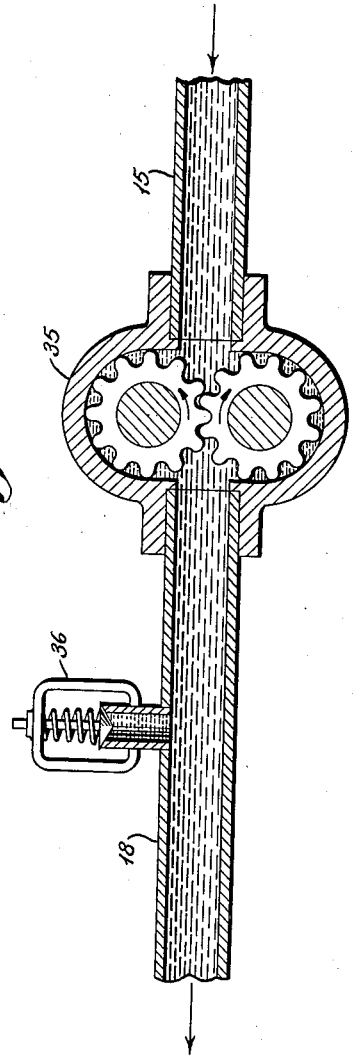
INVENTORS
Robert Levison
and Jan Lodewijk Voigt
BY Stevens, Davis, Miller & Mosher
ATTORNEYS Jan. 6, 1959   R. LEVISON ET AL   2,867,004
PRODUCTION OF POLYAMIDE BARS IN CONTINUOUS PROCESS
Filed Dec. 30, 1954   2 Sheets-Sheet 2

INVENTORS
Robert Levison
and Jan Lodewijk Voigt

BY Stevens, Davis, Miller & Mosher
ATTORNEYS

United States Patent Office 2,867,004
Patented Jan. 6, 1959

2,867,004

PRODUCTION OF POLYAMIDE BARS IN CONTINUOUS PROCESS

Robert Levison, Ede, and Jan Lodewijk Voigt, Arnhem, Netherlands, assignors to N. V. Onderzoekingsinstituut Research, Arnhem, Netherlands, a corporation of The Netherlands Application December 30, 1954, Serial No. 478,816

Claims priority, application Netherlands December 31, 1953

5 Claims. (Cl. 18—55)

This invention relates to a process for the continuous manufacture of bars, profiles, tubes and the like elongated articles from artificial thermoplastic substances.

In the usual process for the continuous manufacture of bars from artificial thermoplastic substances in which the thermoplastic substances have a narrow melting range and in which the transition from the completely liquid state into the solid state occurs in a temperature range of a few degrees, as is the case of superpolyamides and polyesters (polymethylene terephthalate), for instance in the range of less than 20 centigrade degrees, considerable difficulties are met in that the material sticks in the mold and the articles show varying shapes or their surface is not smooth. Also interior cavities may form. With substances such as cellulose acetate in which a general softening occurs over a very wide temperature range these difficulties are not met.

To meet this problem it has been suggested to force lubricants under high pressure into the molding device so that a film of lubricant is produced between the walls of the molding device and the molten thermoplastic material. In this way the difficulties are avoided for the greater part, however, such a system also has its disadvantages in that it is difficult to check the dosage of lubricants used.

It has been found as a part of this invention that the difficulties with regard to thermoplastic substances having a narrow melting range can be quite readily eliminated if the supply of molten substance passing to the molding device is retained under a regulated pressure and at a regulated temperature while maintaining a maximum temperature gradient within the melting range (i. e., shock cooling) as the molten substance enters the molding device.

It is, therefore, an object of this invention to provide a process for molding thermoplastic substances wherein the temperature and pressure is so regulated that a maximum temperature gradient within the melting range is maintained as the molten substance enters the molding device.

According to the present invention the molten substance is guided, prior to entering the molding machine, through a space surrounded by a heat-insulating material.

The pressure regulation is effected by means of an overflow device arranged in the duct through which the molten material passes, this overflow becoming operative at a predetermined pressure, or by a reduction valve provided in the duct to which the molten material passes. The reduction valve is suitable for operation at the temperatures and the pressure used. The temperature regulation is preferably effected by a tempering device provided in the duct to which the material passes.

Having described the present invention in its broader aspects a more detailed description of the process will now be given in discussing the several embodiments of the invention illustrated in the accompanying drawings.

In the drawings, similar reference numerals indicate like parts throughout the several views, wherein:

Figure 1 is a cross-sectional elevation view of an apparatus useful in carrying out the present invention, Figure 2 is a cross-sectional view of one embodiment of the pressure regulating means, and Figure 3 is a cross-sectional elevation view of another embodiment of the pressure regulating means used in the present invention.

Referring now to the drawings and more particularly to Figure 1, reference numeral 10 denotes a hopper for introducing the granular plastic material into the apparatus. Communicating with the discharge end of the hopper 10 is an extrusion device 11 through which the granular plastic material is forced by means of a worm screw 12 positioned centrally and extending longitudinally of device 11. Positioned within the extrusion device 11 and surrounding the worm screw 12 in heat conductive relationship therewith is a heating means 13. The heating means may be composed of any known type of heating element which will raise the temperature in the extrusion device sufficiently high to melt the granular plastic material. Communicating with the extrusion device is a conduit 15 through which the molten plastic material passes upon leaving the extrusion device. In contact with the conduit 15 is a thermometer 16 which registers the surface temperature of the conduit. From the conduit 15 the now molten plastic material passes to a pressure device indicated broadly at 17 and described more fully hereinafter. From the pressure regulating device 17 the material passes through a conduit 18 into a tempering device 19. Attached to the conduit 18 are a thermometer 20 and pressure gauge 21 for indicating, respectively, the temperature and pressure of the molten material passing through conduit 18. The molten material in passing into the tempering device 19 contacts a torpedo 22 which because of its shape causes the material in passing there-around to take the shape of a relatively thin film. Surrounding the tempering device is a housing 23 through which a temperature regulating fluid may enter at 24 and leave at 25. The temperature regulation by means of the housing and torpedo in combination, results in very accurate and uniform heating of the molten plastic material prior to its entry into the molding device. Attached to the exit end of the tempering device 19 is a thermometer 26 for indicating the temperature of the molten material as it leaves the tempering device. Communicating with the exit end of the tempering device is a conduit 27 made of a heat-insulating material which will allow for the greatest range in temperature drop within the melting range when the molten mass passes from the molten state to the solid state. The heat-insulating material may be for instance glass, polytetrafluoroethylene or an asbestos product. It is preferred to use an asbestos product for this conduit. It is also preferable that the conduit have the same internal cross-section as the molding device which allows for easier flowing material through the apparatus. Communicating with the conduit 21 is a molding device 28 which in the drawing is shown as a tube although it is contemplated that the molding device may be of various shapes. The molding device is cooled by means of a jacket 29 through which a cooling liquid flows in and out by means of inlet 30 and outlet 31. The solidified bar 32, which is drawn out of the molding device 28 by means of rollers 33 and 34, has a slightly lesser diameter than the diameter of the molding device due to solidification shrinkage.

The effect of the heat-insulating conduit 27, according to the present invention, is that at the location where molten material solidifies in the conduit 27 no gradual temperature transition occurs, and hence in the region of the first solidification no extremely thin film of solid material is formed which film would be pressed against the wall by the molten material. On the contrary, as shown in Figure 1, a relatively thick coat is formed at the place of the first solidification (solidified material in the connecting conduit 27 and the molding device 28 has been hatched in Figure 1) this coat moving along in the molding device while gradually increasing in thickness. If the pressure is not too high this thick layer prevents the solidified material from adhering to the wall regardless of its rate of feed. At high pressures the solidified mass moves along with jolts and no uniform product is formed. When the pressure is too low the molds are not sufficiently filled and flaws occur.

When bars are made from nylon 6 (from epsilon caprolactam) the temperature at thermometer 16 is in general 260° C., this temperature being considerably higher, in connection with a smooth operation of the pressure regulating device 17, than required for obtaining a liquid material suitable for molding. At thermometer 20 the temperature is about 225° C. and at the thermometer 26 the temperature is about 230° C. The pressure before the tempering device 19, adjusted by means of the pressure regulating device 17, depends on the thickness of the bar to be manufactured. The following table shows the pressure conditions for bars of various sizes.

| Diameter of bar: | Pressure, atm. |
| --- | --- |
| 6 mm | 8 |
| 6 mm | 12 |
| 9 mm | 15 |
| 12 mm | 16–20 |

The cooling water in the cooling jacket 29 is generally kept at about 10° C. and the temperature of the bar 32 emerging from the molding device 28 is in general about 60° C.

In the production of bars from other thermoplastic materials having a narrow melting range favorable results are obtained when applying the process according to the present invention.

Referring now to the pressure regulating device 17 and more particularly to the embodiment thereof shown in Figure 2, molten material passing through conduit 15 enters gear pump 35 which is provided with a subsequent overflow valve 36. The output of the gear pump 35 is so adjusted that the pressure on the downstream side of the gear pump is always somewhat higher than the pressure at which the overflow valve 36 is adjusted and therefore a small amount of molten material always passes through the valve 36. The excess plastic material emerging from the overflow valve 36 may be worked up again into grains or may be fed back to the conveyer screw 12.

Referring now to Figure 3 wherein the pressure regulating device 17 of Figure 1 comprises a liquid reduction valve 37, this valve is suitable for the pressures and temperatures at which the operation described herein takes place. When such a reduction valve is used no overflow is required and the necessity of feeding back or remelting the plastic material is therefore avoided. In the reduction valve 37 a piston 38 is disposed which is provided with a cross bore 39 having in communication therewith a bore 40 in the longitudinal axis of the piston 38. The cross bore 39 communicates with a ring shaped bore 41 in the body of the valve 37. This ring shaped bore 41 also communicates with ducts 15 and 18 so that the molten plastic material may flow into the valve through duct 15 and out of the valve through duct 18. Valve 37 is so adjusted that as soon as the pressure in duct 18 becomes too high, the piston 38 moves upwardly and consequently the ring shaped bore 41 is entirely or at least partly closed by the piston 38. The pressure at which the piston moves upwardly is regulated by means of a spring 42 contacting a ring 43 which in turn is connected to a pin 44. Pin 44 regulates the position of an auxiliary piston 45. The movement of the piston 38 is transmitted to the auxiliary piston 45 by means of a heat resisting grease in the space at 46 between the two pistons. Such a heat resistant grease may consist for instance of organic polysiloxanes.

What is claimed is:

1. A continuous process for the manufacture of elongated shaped articles of substantial cross-section from an artificial thermoplastic substance having a narrow melting range comprising the steps in sequence of melting said artificial thermoplastic substance to form a free-flowing liquid, feeding the liquid in the form of a stream under pressure at a substantially uniform temperature through a heat-insulating zone to a molding zone immediately following the heat-insulating zone, shock cooling the stream upon entry into the molding zone to form a thick solid annulus of the material adjacent the entrance to the molding zone, moving the annulus through the molding zone where it becomes progressively thicker until a solid elongated shaped article is formed, and continuously pulling the formed elongated article under tension from the cooled molding zone.

2. A process as defined in claim 1 wherein the liquid stream is divided and then recombined before entering the molding zone.

3. A process as defined in claim 1 wherein the artificial thermoplastic substance is a superpolyamide.

4. A process as defined in claim 3 wherein the pressure at which the liquid is introduced into the molding zone does not exceed 20 atmospheres.

5. A process as defined in claim 4 wherein the superpolyamide is a polymer of epsilon-caprolactam.

References Cited in the file of this patent

UNITED STATES PATENTS

| 2,335,308 | Pendergrast et al. | Nov. 30, 1943 |
| 2,384,521 | Andersen et al. | Sept. 11, 1945 |
| 2,540,146 | Stober | Feb. 6, 1951 |
| 2,692,405 | Gayler | Oct. 26, 1954 |
| 2,717,418 | Piperoux et al. | Sept. 13, 1955 |
| 2,719,330 | Stott | Oct. 4, 1955 |
| 2,747,222 | Koch et al. | May 29, 1956 |
| 2,747,224 | Koch et al. | May 29, 1956 |

FOREIGN PATENTS

| 153,607 | Australia | Oct. 13, 1953 |